(12) United States Patent
Viteri

(10) Patent No.: US 7,021,063 B2
(45) Date of Patent: Apr. 4, 2006

(54) REHEAT HEAT EXCHANGER POWER GENERATION SYSTEMS

(75) Inventor: Fermin Viteri, Sacramento, CA (US)

(73) Assignee: Clean Energy Systems, Inc., Rancho Cordova, CA (US)

( * ) Notice: Subject to any disclaimer, the term of this patent is extended or adjusted under 35 U.S.C. 154(b) by 0 days.

(21) Appl. No.: 10/798,182

(22) Filed: Mar. 10, 2004

(65) Prior Publication Data

US 2004/0221581 A1 Nov. 11, 2004

Related U.S. Application Data

(60) Provisional application No. 60/453,760, filed on Mar. 10, 2003.

(51) Int. Cl.
*F02C 3/10* (2006.01)
(52) U.S. Cl. ................... 60/791; 60/39.17; 60/39.5
(58) Field of Classification Search .......... 60/772–775, 60/791, 39.17, 39.5, 39.52, 39.53, 39.15, 60/39.55
See application file for complete search history.

(56) References Cited

U.S. PATENT DOCUMENTS

| 864,017 | A | 8/1907 | Miller |
| 886,274 | A | 4/1908 | Tate |
| 1,013,907 | A | 1/1912 | Taylor |
| 1,227,275 | A | 5/1917 | Kraus |
| 1,372,121 | A | 3/1921 | Davis |
| 1,820,755 | A | 8/1931 | McMullen |
| 1,828,784 | A | 10/1931 | Perrin |
| 2,004,317 | A | 6/1935 | Forster |
| 2,033,010 | A | 3/1936 | Russell |
| 2,078,956 | A | 5/1937 | Lysholm |
| 2,168,313 | A | 8/1939 | Bichowsky |
| 2,218,281 | A | 10/1940 | Ridder |
| 2,359,108 | A | 9/1944 | Hoskins |
| 2,368,827 | A | 2/1945 | Hanson |
| 2,374,710 | A | 5/1945 | Smith |
| 2,417,835 | A | 3/1947 | Moore |
| 2,428,136 | A | 9/1947 | Barr |

(Continued)

FOREIGN PATENT DOCUMENTS

DE 1301821 8/1969

(Continued)

OTHER PUBLICATIONS

Dorf et al. "The Engineering Handbook", 1996 by CRC Press, Inc., pp. 531-533.*

(Continued)

*Primary Examiner*—William H. Rodriguez
(74) *Attorney, Agent, or Firm*—Heisler & Associates

(57) ABSTRACT

A reheat heat exchanger is provided particularly for use in Rankine cycle power generation systems. The reheat heat exchanger includes a high pressure path between a high pressure inlet and a high pressure outlet. The reheat heat exchanger also includes a low pressure path between a low pressure inlet and a low pressure outlet. The two paths are in heat transfer relationship. In a typical power generation system utilizing the reheat heat exchanger, the high pressure inlet is located downstream from a source of high temperature high pressure working fluid. An expander is located downstream from the high pressure outlet and upstream from the low pressure inlet. A second expander is typically provided downstream from the low pressure outlet. The reheat heat exchanger beneficially enhances the efficiency of power generation systems, particularly those which utilize expanders having inlet temperatures limited to below that produced by the source of working fluid.

15 Claims, 7 Drawing Sheets

U.S. PATENT DOCUMENTS

| | | | |
|---|---|---|---|
| 2,469,238 A | 5/1949 | Newton | |
| 2,476,031 A | 7/1949 | Farkas | |
| 2,478,682 A | 8/1949 | Blackwood | |
| 2,487,435 A | 11/1949 | Goddard | |
| 2,523,656 A | 9/1950 | Goddard | |
| 2,547,093 A | 4/1951 | Ray | |
| 2,563,028 A | 8/1951 | Goddard | |
| 2,568,787 A | 9/1951 | Bosch | |
| 2,582,938 A | 1/1952 | Eastman | |
| 2,605,610 A | 8/1952 | Hermitte | |
| 2,621,475 A | 12/1952 | Loy | |
| 2,636,345 A | 4/1953 | Zoller | |
| 2,644,308 A * | 7/1953 | Downs | 60/678 |
| 2,654,217 A | 10/1953 | Rettaliata | |
| 2,656,677 A | 10/1953 | Peterson | |
| 2,662,373 A | 12/1953 | Sherry | |
| 2,678,531 A | 5/1954 | Miller | |
| 2,678,532 A | 5/1954 | Miller | |
| 2,697,482 A | 12/1954 | Blizard | |
| 2,717,491 A | 9/1955 | Barr | |
| 2,722,100 A | 11/1955 | Goddard | |
| 2,763,987 A | 9/1956 | Kretschmer | |
| 2,770,097 A | 11/1956 | Walker | |
| 2,832,194 A | 4/1958 | Kuhner | |
| 2,869,324 A | 1/1959 | Foote | |
| 2,884,912 A | 5/1959 | Lewis | |
| 2,902,831 A * | 9/1959 | Ipsen et al. | 60/656 |
| 2,916,877 A | 12/1959 | Walter | |
| 2,986,882 A | 6/1961 | Pavlecka | |
| 3,038,308 A | 6/1962 | Fuller | |
| 3,054,257 A | 9/1962 | Schelp | |
| 3,101,592 A | 8/1963 | Robertson | |
| 3,134,228 A | 5/1964 | Wolansky | |
| 3,183,864 A | 5/1965 | Stengel | |
| 3,218,802 A * | 11/1965 | Sawle | 376/380 |
| 3,222,883 A * | 12/1965 | Glaspie | 62/172 |
| 3,238,719 A | 3/1966 | Harslem | |
| 3,298,176 A | 1/1967 | Forsyth | |
| 3,302,596 A | 2/1967 | Zinn | |
| 3,315,467 A | 4/1967 | DeWitt | |
| 3,331,671 A | 7/1967 | Goodwin | |
| 3,335,565 A | 8/1967 | Aguet | |
| 3,359,723 A | 12/1967 | Bohensky | |
| 3,364,121 A * | 1/1968 | Schluderberg | 376/387 |
| 3,385,381 A | 5/1968 | Calaman | |
| 3,423,028 A | 1/1969 | Stupakis | |
| 3,459,953 A | 8/1969 | Hughes | |
| 3,559,402 A | 2/1971 | Stone | |
| 3,574,507 A | 4/1971 | Kydd | |
| 3,608,529 A | 9/1971 | Smith | |
| 3,649,469 A | 3/1972 | MacBeth | |
| 3,657,879 A | 4/1972 | Ewbank | |
| 3,677,239 A | 7/1972 | Elkins | |
| 3,693,347 A | 9/1972 | Kydd | |
| 3,702,110 A | 11/1972 | Hoffman | |
| 3,703,807 A | 11/1972 | Rice | |
| 3,724,212 A * | 4/1973 | Bell | 376/371 |
| 3,731,485 A | 5/1973 | Rudolph | |
| 3,736,745 A | 6/1973 | Karig | |
| 3,738,792 A | 6/1973 | Feng | |
| 3,747,336 A | 7/1973 | Dibelius | |
| 3,751,906 A | 8/1973 | Leas | |
| 3,772,881 A | 11/1973 | Lange | |
| 3,779,212 A | 12/1973 | Wagner | |
| 3,792,690 A | 2/1974 | Cooper | |
| 3,804,579 A | 4/1974 | Wilhelm | |
| 3,807,373 A | 4/1974 | Chen | |
| 3,826,080 A | 7/1974 | DeCorso | |
| 3,831,373 A | 8/1974 | Flynt | |
| 3,850,569 A | 11/1974 | Alquist | |
| 3,854,283 A | 12/1974 | Stirling | |
| 3,862,624 A | 1/1975 | Underwood | |
| 3,862,819 A | 1/1975 | Wentworth | |
| 3,928,961 A | 12/1975 | Pfefferle | |
| 3,928,976 A * | 12/1975 | Braytenbah et al. | 60/660 |
| 3,972,180 A | 8/1976 | Van Gelder | |
| 3,978,661 A | 9/1976 | Cheng | |
| 3,980,064 A | 9/1976 | Ariga | |
| 3,982,878 A | 9/1976 | Yamane | |
| 4,063,414 A | 12/1977 | Sata | |
| 4,118,925 A | 10/1978 | Sperry | |
| 4,118,944 A * | 10/1978 | Lord et al. | 62/98 |
| 4,133,171 A | 1/1979 | Earnest | |
| 4,148,185 A | 4/1979 | Somers | |
| 4,193,259 A | 3/1980 | Muenger | |
| 4,194,890 A | 3/1980 | McCombs | |
| 4,199,327 A | 4/1980 | Hempill | |
| 4,224,299 A | 9/1980 | Barber | |
| 4,224,991 A | 9/1980 | Sowa | |
| 4,249,371 A | 2/1981 | Romeyke | |
| 4,271,664 A | 6/1981 | Earnest | |
| 4,273,743 A | 6/1981 | Barber | |
| 4,297,841 A | 11/1981 | Cheng | |
| 4,313,300 A | 2/1982 | Wilkes | |
| 4,327,547 A | 5/1982 | Hughes . | |
| 4,338,789 A * | 7/1982 | Dolan | 60/652 |
| 4,377,067 A | 3/1983 | Sternfeld | |
| 4,387,577 A * | 6/1983 | Campbell | 60/680 |
| 4,401,153 A * | 8/1983 | Marsch et al. | 165/134.1 |
| 4,425,755 A | 1/1984 | Hughes | |
| 4,426,842 A | 1/1984 | Collet | |
| 4,434,613 A | 3/1984 | Stahl | |
| 4,438,809 A * | 3/1984 | Papis | 165/166 |
| 4,456,069 A | 6/1984 | Vigneri | |
| 4,465,023 A | 8/1984 | Wagner | |
| 4,498,289 A | 2/1985 | Osgerby | |
| 4,499,721 A | 2/1985 | Cheng | |
| 4,509,324 A | 4/1985 | Urbach | |
| 4,519,769 A | 5/1985 | Tanaka | |
| 4,528,811 A | 7/1985 | Stahl | |
| 4,533,314 A | 8/1985 | Herberling | |
| 4,549,397 A | 10/1985 | Cheng | |
| 4,553,588 A * | 11/1985 | Geissler | 165/162 |
| 4,589,478 A * | 5/1986 | Wunder | 165/76 |
| 4,622,007 A | 11/1986 | Gitman | |
| 4,631,914 A | 12/1986 | Hines | |
| 4,635,712 A * | 1/1987 | Baker et al. | 165/82 |
| 4,657,009 A | 4/1987 | Zen | |
| 4,674,463 A | 6/1987 | Duckworth | |
| 4,680,927 A | 7/1987 | Cheng | |
| 4,716,737 A | 1/1988 | Mandrin | |
| 4,731,989 A | 3/1988 | Furuya | |
| 4,765,143 A | 8/1988 | Crawford | |
| 4,825,650 A | 5/1989 | Hosford | |
| 4,841,721 A | 6/1989 | Patton | |
| 4,845,940 A | 7/1989 | Beer | |
| 4,858,681 A * | 8/1989 | Sulzberger | 165/70 |
| 4,884,529 A | 12/1989 | Byrnes | |
| 4,899,537 A | 2/1990 | Cheng | |
| 4,910,008 A | 3/1990 | Prudhon | |
| 4,916,904 A | 4/1990 | Ramsaier | |
| 4,928,478 A | 5/1990 | Maslak | |
| 4,942,734 A | 7/1990 | Markbreiter | |
| 4,948,055 A | 8/1990 | Belcher | |
| 4,982,568 A | 1/1991 | Kalina | |
| 4,987,735 A | 1/1991 | DeLong | |
| 5,001,906 A * | 3/1991 | Engdahl et al. | 62/434 |
| 5,050,375 A | 9/1991 | Dickinson | |
| 5,055,030 A | 10/1991 | Schirmer | |
| 5,069,031 A | 12/1991 | Shekleton | |
| 5,088,450 A | 2/1992 | Sternfeld | |
| 5,103,630 A | 4/1992 | Correa | |
| 5,131,225 A | 7/1992 | Roettger | |
| 5,165,239 A * | 11/1992 | Bechtel et al. | 60/683 |

| | | |
|---|---|---|
| 5,175,994 A | 1/1993 | Fox |
| 5,175,995 A | 1/1993 | Pak |
| 5,199,263 A * | 4/1993 | Green et al. .................. 60/670 |
| 5,247,791 A | 9/1993 | Pak |
| 5,265,410 A | 11/1993 | Hisatome |
| 5,285,628 A | 2/1994 | Korenberg |
| 5,304,356 A | 4/1994 | Iijima |
| 5,323,603 A * | 6/1994 | Malohn ....................... 60/784 |
| 5,329,758 A | 7/1994 | Urbach |
| 5,353,589 A | 10/1994 | Althaus |
| 5,363,642 A | 11/1994 | Frutschi |
| 5,364,611 A | 11/1994 | Iijima |
| 5,413,879 A | 5/1995 | Domeracki |
| 5,417,053 A | 5/1995 | Uji |
| 5,449,568 A | 9/1995 | Micheli |
| RE35,061 E | 10/1995 | Correa |
| 5,473,899 A | 12/1995 | Viteri |
| 5,479,781 A | 1/1996 | Fric |
| 5,482,791 A | 1/1996 | Shingai |
| 5,490,377 A | 2/1996 | Janes |
| 5,491,969 A | 2/1996 | Cohn |
| 5,511,971 A | 4/1996 | Benz |
| 5,535,584 A | 7/1996 | Janes |
| 5,541,014 A | 7/1996 | Micheli |
| 5,557,936 A | 9/1996 | Drnevich |
| 5,570,578 A * | 11/1996 | Saujet et al. .................. 60/647 |
| 5,572,861 A | 11/1996 | Shao |
| 5,581,997 A | 12/1996 | Janes |
| 5,590,518 A | 1/1997 | Janes |
| 5,590,528 A | 1/1997 | Viteri |
| 5,617,719 A | 4/1997 | Ginter |
| 5,628,184 A | 5/1997 | Santos |
| 5,636,980 A | 6/1997 | Young |
| 5,644,911 A | 7/1997 | Huber |
| 5,678,408 A | 10/1997 | Janes |
| 5,678,647 A | 10/1997 | Wolfe |
| 5,679,134 A | 10/1997 | Brugerolle |
| 5,680,764 A | 10/1997 | Viteri |
| 5,687,560 A | 11/1997 | Janes |
| 5,709,077 A | 1/1998 | Beichel |
| 5,715,673 A | 2/1998 | Beichel |
| 5,724,805 A | 3/1998 | Golomb |
| 5,724,806 A * | 3/1998 | Horner ....................... 60/785 |
| 5,727,379 A * | 3/1998 | Cohn ....................... 60/39.182 |
| 5,754,613 A * | 5/1998 | Hashiguchi et al. ........ 376/378 |
| 5,761,896 A | 6/1998 | Dowdy |
| 5,793,831 A * | 8/1998 | Tsiklauri et al. ............ 376/317 |
| 5,794,447 A * | 8/1998 | Nicodemus .................. 60/654 |
| 5,802,840 A | 9/1998 | Wolf |
| 5,852,925 A | 12/1998 | Prasad |
| 5,906,806 A | 5/1999 | Clark |
| 5,955,039 A | 9/1999 | Dowdy |
| 5,956,937 A | 9/1999 | Beichel |
| 5,968,680 A | 10/1999 | Wolfe |
| 5,970,702 A | 10/1999 | Beichel |
| 5,997,595 A | 12/1999 | Yokohama |
| 6,170,264 B1 | 1/2001 | Viteri |
| 6,196,000 B1 | 3/2001 | Fassbender |
| 6,206,684 B1 | 3/2001 | Mueggenburg |
| 6,247,316 B1 | 6/2001 | Viteri |
| 6,260,348 B1 | 7/2001 | Sugishita |
| 6,301,895 B1 * | 10/2001 | Kallina et al. ................ 60/653 |
| 6,389,814 B1 | 5/2002 | Viteri |
| 6,422,017 B1 * | 7/2002 | Bassily ....................... 60/653 |
| 6,523,349 B1 | 2/2003 | Viteri |
| 6,598,398 B1 | 7/2003 | Viteri |
| 6,607,854 B1 | 8/2003 | Rehg |
| 6,622,470 B1 | 9/2003 | Viteri |
| 6,637,183 B1 | 10/2003 | Viteri |
| 6,808,017 B1 * | 10/2004 | Kaellis ....................... 165/159 |

FOREIGN PATENT DOCUMENTS

| | | |
|---|---|---|
| DE | 2933932 | 12/1982 |
| DE | 3122338 | 5/1983 |
| DE | 2111602 | 7/1983 |
| DE | 3512947 | 10/1986 |
| EP | 0197555 | 4/1986 |
| EP | 0413199 | 2/1991 |
| EP | 0546501 | 6/1993 |
| EP | 06318464 | 11/1994 |
| EP | 0634562 | 1/1995 |
| EP | 2001015134 | 1/2001 |
| EP | 2001085036 | 3/2001 |
| FR | 350612 | 1/1905 |
| GB | 6394 | 5/1898 |
| GB | 140516 | 3/1920 |
| GB | 271706 | 5/1927 |
| JP | 2000074308 A * | 3/2000 |
| WO | WO 91/02886 | 3/1991 |
| WO | WO 94/10427 | 5/1994 |
| WO | WO 96/07024 | 3/1996 |
| WO | WO 97/44574 | 11/1997 |
| WO | WO 99/22127 | 5/1999 |
| WO | WO 99/63210 | 12/1999 |
| WO | WO 01/75277 | 10/2001 |

OTHER PUBLICATIONS

Reinkenhof, J. et al.; Steam Generation with Modified H2/O2—Rocket Engines; unknown date.

Sternfeld, H.; A Hydrogen/Oxygen Steam Generator for the Peak-Load Management of Steam Power Plants; unknown date.

Brauser, S. et al.; A Proposed Hydrogen-Oxygen Power Cycle; 1967; Stillwater, Oklahoma.

Reese, R. et al.; A Proposed Hydrogen-Oxygen Fueled Steam Cycle for the Propulsion of Deep Submersibles; 1971; Massachusetts.

Lotker, M.; Hydrogen for the Electric Utilities—Long Range Possibilities; 1974; Hartford, Connecticut.

Lucci, A. et al.; Title Unknown (IECEC '75 Record); 1975; Canoga Park, California.

De Biasi, V.; A Look into Real Payoffs for Combined Cycle Conversions; Gas Turbine World; 1984; pp. 17, 18, 20, 22.

Pak, P. S. et al.; Closed Dual Fluid Gas Turbine Power Plant without Emission of CO2 into the Atmosphere; IFAC/IFORS/IAEE Symposium; 1989; Pergamon Press; Tokyo, Japan.

Yantovskii, E. I.; The Thermodynamics of Fuel-Fired Power Plants without Exhaust Gases; Nov. 1991; Geneva.

Yantovskii, E. I.; Computer Exergonomics of Power Plants without Exhaust Gases; Energy Convers. Mgmt.; 1992; pp. 405-412; vol. 33, No. 5-8; Pergamon Press Ltd.; Great Britain.

Bolland, O. et al.; New Concepts for Natural Gas Fired Power Plants which Simplify the Recovery of Carbon Dioxide; Energy Convers. Mgmt.; 1992; pp. 467-475; vol. 33, No. 5-8; Pergamon Press Ltd.; Great Britain.

Hendriks, C.A. et al.; Carbon Dioxide Recovery Using a Dual Gas Turbine IGCC Plant; Energy Convers. Mgmt.; 1992; pp. 387-396; vol. 33, No. 5-8; Pergamon Press Ltd.; Great Britain.

Mercea, P. V. et al.; Oxygen Separation from Air by a Combined Pressure Swing Adsorption and Continuous Membrane Column Process; Journal of Membrane Science; 1994; pp. 131-144; Cincinnati, Ohio.

Bolland, O. et al.; Comparative Evaluation of Combined Cycles and Gas Turbine Systems with Water Injection, Steam Injection, and Recuperation; Transactions of the ASME; Jan. 1995; pp. 138-140, 142-145; vol. 117.

The NOx Report; Feb. 20, 1995; vol. 1, No. 1.

Alkam, M. K. et al.; Methanol and Hydrogen Oxidation Kinetics in Water at Supercritical States; 1995; The University of Iowa; Iowa City, Iowa.

Rice, I. G.; Steam-Injected Gas Turbine Analysis: Steam Rates; Journal of Engineering for Gas Turbines and Power; Apr. 1995; pp. 347-353; vol. 117.

Yantovskii, E. I.; A Zero Emission Combustion Power Plant for Enhanced Oil Recovery; Energy; 1995; vol. 20, No. 8; pp. 823-828.

Kolp, D. A. et al.; Advantages of Air Conditioning and Supercharging an LM6000 Gas Turbine Inlet; Journal of Engineering for Gas Turbines and Power; Jul. 1995; vol. 117.

EPA Proposes Across-the-Board Phase II NOx Limitations; Air Pollution Regulatory Analysis Service; Jan. 19, 1996; Article No. 96-2.

Agazzani, A. et al.; An Assessment of the Performance of Closed Cycles with and without Heat Rejection at Cryogenic Temperatures; International Gas Turbine and Aeroengine Congress & Exhibition; Jun. 10-13, 1996; Birmingham, UK.

Facchini, B. et al.; Semi-Closed Gas Turbine/Combined Cycle with Water Recovery and Extensive Exhaust Gas Recirculation; International Gas Turbine and Aeroengine Congress & Exhibition; Jun. 10-13, 1996; Birmingham, UK.

Nakhamkin, M. et al.; The Cascaded Humidified Advanced Turbine (CHAT) ; Journal of Engineering for Gas Turbines and Power; Jul. 1996; pp. 565-571; vol. 118.

Rice, I. G.; Split Stream Boilers for High-Temperature/High-Pressure Topping Steam Turbine Combined Cycles; Journal of Engineering for Gas Turbines and Power; Apr. 1997; pp. 385-394; vol. 119.

Ulizar, I. et al.; A Semiclosed-Cycle Gas Turbine with Carbon Dioxide-Argon as Working Fluid; Journal of Engineering for Gas Turbines and Power; Jul. 1997; pp. 612-616; vol. 19.

Wilson, D. G. et al.; The Design of High-Efficiency Turbomachinery and Gas Turbines, Second Edition; 1998; pp. 146-161; Prentice Hall; Upper Saddle River, New Jersey.

Bannister, R. L. et al.; Development of a Hydrogen-Fueled Combustion Turbine Cycle for Power Generation; Transactions of the ASME; Apr. 1998; pp. 276-283; vol. 120.

Mathieu, P. et al.; Zero-Emission MATIANT Cycle; Transactions of the ASME; Jan. 1999; pp. 116-120, vol. 121.

Norwegian Idea for CO2-Free Power Generation; Greenhouse Issues; Mar. 1999.

Aker Maritime; HiOx Gas Fired Power Plants without Atmospheric Emissions; Jun. 1999.

Turkenburg, W. C. et al.; Fossil Fuels in a Sustainable Energy Supply: The Significance of CO2 Removal; A Memorandum at the Request of the Ministry of Economic Affairs the Hague; Jun. 1999; pp. 1-26; Utrecht.

Bilger, R. W.; Zero Release Combustion Technologies and the Oxygen Economy; Fifth Int'l Conference on Technologies and Combustion for a Clean Environment; Jul. 1999; Lisbon, Portugal.

Bilger, R. W.; The Future for Energy from Combustion of Fossil Fuels; Fifth Int'l Conference on Technologies and Combustion for a Clean Environment; Jul. 1999; Lisbon, Portugal.

Herzog, H. et al.; Capturing Greenhouse Gases; Scientific American; Feb. 2000; pp. 72-79.

Anderson, R. E. et al.; A Unique Process for Production of Environmentally Clean Electric Power using Fossil Fuels; 8th International Symposium on Transport Phenomena and Dynamics of Rotating Machinery; Mar. 2000; pp. 1-6; Honolulu, Hawaii.

Chiesa, P. et al.; Natural Gas Fired COmbined Cycles with Low CO2 Emissions; Journal of Engineering for Gas Turbines and Power; Jul. 2000; pp. 429-436; vol. 122.

Henriks, C.A. et al.; Costs of Carbon Dioxide Removal by Underground Storage; 5th International Conference on Greenhouse Gas Control Technologies (GHGT-5) ; Aug. 2000; Cairns, Australia.

Hustad, C. W.; Review Over Recent Norwegian Studies Regarding Cost of Low CO2-Emission Power Plant Technology; 5th International Conference on Greenhouse Gas Control Technology; Aug. 2000; Cairns, Australia.

* cited by examiner

Table 1
Rankine Cycle Summary Using
Current Steam Turbine Technology

| Config. | Components | Net Input Power kW | Net Power w CO2/O2 kW | Net Eff. w CO2/O2 kW | Net Power wo CO2/O2 kW | Net Eff. wo CO2/O2 kW | LOX Plant Size Tons/Day | CO2 Production Tons/Day |
|---|---|---|---|---|---|---|---|---|
| Fig. 2 | GG Only | 22,770 | 7,230 | 0.32 | 9,200 | 0.40 | 173 | 119 |
| Fig. 3 | GG, IPT RHX | 22,770 | 8,086 | 0.36 | 10,059 | 0.44 | 173 | 119 |
| Fig. 4 | GG, IPT RHC | 28,465 | 9,508 | 0.34 | 11,974 | 0.42 | 216 | 150 |
| Fig. 5 | GG, IPT RHC, LPTRHX | 35,183 | 12,149 | 0.35 | 16,198 | 0.46 | 267 | 184 |
| Fig. 6 | GG, IPT RHC, LPTRHX & FW Heater #2 | 55,404 | 21,045 | 0.38 | 25,846 | 0.48 | 420 | 290 | w CO2/O2 – With CO2 Sequestration and O2 Separation Power
wo CO2/O2 – Without CO2 Sequestration and O2 Separation Power

Fig. 7

REHEAT HEAT EXCHANGER POWER GENERATION SYSTEMS

CROSS-REFERENCE TO RELATED APPLICATIONS

This application claims benefit under Title 35, United States Code §119(e) of U.S. Provisional Application No. 60/453,760 filed on Mar. 10, 2003.

FIELD OF THE INVENTION

The following invention relates to power generation systems such as Rankine cycle steam power generation systems which include boilers or other sources of high temperature, high pressure working fluid, turbines or other expanders to output power from the system, and optionally other equipment. More particularly, this invention relates to such power generation systems which beneficially maximize efficiency by providing a reheat heat exchanger having a high pressure path upstream from a first expander and a low pressure path downstream from the first expander.

BACKGROUND OF THE INVENTION

Rankine cycle power generation systems, such as steam power plants, have long been in use as a source of electric power. A typical steam power plant includes a boiler which heats a pressurized working fluid (typically water) to a high temperature, and high pressure. The high temperature high pressure steam is then fed to a turbine where it is expanded to a lower pressure and where it is also reduced in temperature. The turbine outputs power from the power plant. Thereafter, the steam is typically condensed back to a liquid and then pumped to a higher pressure before being returned to the boiler.

The amount of electric power outputted by the power plant is a function of the amount of heat energy put into the water at the boiler and a function of the overall efficiency of the power plant. Numerous techniques are utilized to enhance the efficiency of the power plant. In many power plants multiple turbines are provided with progressively lower inlet pressures and inlet temperatures so that all of the available energy in the working fluid can be extracted. In many such power plants reheaters are provided, typically in the form of additional boilers, which reheat the working fluid between the multiple turbines.

Another efficiency enhancing technique involves increasing a temperature of the steam, particularly at the discharge from the boiler and the inlet to the turbine. When a temperature difference between the inlet of the highest pressure turbine and the discharge of the lowest pressure turbine is increased, the efficiency of the power generation system is increased. However, the constraints of different materials available for use within the boiler and within the turbine restrict the practical temperatures which can be achieved at the inlets to the turbine, hence limiting maximum attainable efficiency.

While high temperatures (above 1050° F.) do present some challenges in turbine design and operation, boiler maximum temperature limitations have been the primary impediment to increasing inlet temperatures for turbines within steam power plants. Hence, while steam turbines having inlet temperatures higher than 1050° F. (for example) might be relatively easily designed and manufactured, the relative difficulty in providing boilers that can provide steam at temperatures above 1050° F. have made the development of such higher temperature turbines unimportant.

Recently new methods for generating high temperature high pressure working fluids for Rankine cycle power generation have been introduced, making possible higher temperature steam, and potentially correspondingly higher efficiency within Rankine cycle power generation systems. Specifically, U.S. Pat. Nos. 5,473,899; 5,590,528; 5,680,764; 5,709,077; 5,715,673; 5,956,937; 5,970,702; 6,170,264; 6,206,684; 6,247,316; 6,389,814; and 6,523,349, incorporated herein by reference, describe in detail a gas generator which combusts a fuel, typically a hydrocarbon fuel, but optionally hydrogen, syngas from coal or other sources, etc. with oxygen to produce a working fluid of steam and carbon dioxide. As the oxidizer is oxygen rather than air, temperatures of up to 3000° F. are attainable, with temperatures of over 1500° F. readily obtained in such gas generators.

Disadvantageously, existing steam turbines of appropriate inlet pressures have been developed for lower temperatures than 1500° F. Hence, power generation systems utilizing such gas generators require additional water or other diluent to be added to the working fluid to drop the temperature from over 1500° F. down to approximately 1050° F., so that no damage is done to the turbines. This dilution of the working fluid and reduction in temperature decreases the overall efficiency of the power generation system.

With such power generation systems, providing reheaters between the high pressure turbine and lower pressure turbines increases the efficiency of such power generation systems somewhat. However, further increases in efficiency would still further enhance the attractiveness of such power generation systems. As such oxyfuel combustion based power generation systems produce products of combustion of substantially only steam and carbon dioxide, such power generation systems hold tremendous promise in eliminating the air pollution typically generated by combustion based power generation systems. Accoringly, a need exists for ways to enhance the efficiency of such power generation systems without requiring turbines having inlet temperatures greater than those already exhibited by existing steam turbines, such as approximately 1050° F.

SUMMARY OF THE INVENTION

This invention provides various power generation systems which uniquely benefit from including a reheat heat exchanger component therein. The reheat heat exchanger includes a high pressure path in heat transfer relationship with a low pressure path. The reheat heat exchanger thus utilizes excess heat within a high pressure working fluid of a power generation system to reheat the working fluid after it has been discharged from an expander, and before the working fluid has passed to a second expander or otherwise beneficially utilized at the lower pressure.

The high pressure path extends between a high pressure inlet and a high pressure outlet. The low pressure path extends between a low pressure inlet and a low pressure outlet. Preferably, the reheat heat exchanger is configured to include a plurality of tubes extending between a pair of tube sheets with one of the tube sheets adjacent the high pressure inlet and the other of the tube sheets adjacent the high pressure outlet. The high pressure path thus passes within an interior of the tubes. The tubes are within a casing and preferably have a plurality of baffles extending substantially perpendicularly to the tubes and between the low pressure inlet and the low pressure outlet. The low pressure path thus passes adjacent exterior surfaces of the tubes and between the low pressure inlet and the low pressure outlet within the casing, with a length of the low pressure path extended by the positioning of the baffles.

When a gas generator or other source of high temperature high pressure working fluid is provided which exceeds an inlet temperature for a high pressure turbine of the power generation system, the reheat heat exchanger is interposed between this source of high temperature high pressure working fluid and the high pressure turbine. The high pressure path is located between the source of working fluid and the high pressure turbine. Thus, a temperature of the working fluid is reduced to a maximum inlet temperature for the high pressure turbine. The working fluid is expanded within the high pressure turbine to a lower pressure. It is then routed through the low pressure path of the reheat heat exchanger where the working fluid is reheated, preferably up to a temperature similar to a maximum inlet temperature for a second expander within the power generation system.

In various different embodiments of this invention additional turbines can be provided, and combustion based reheaters can also be provided to both further expand the working fluid, increase a temperature of the working fluid, and otherwise handle the working fluid in a fashion which maximizes efficiency of the power generation system. Preferably, the fully expanded working fluid is passed to a condenser or other separator where the steam and carbon dioxide within the working fluid are at least partially separated. The carbon dioxide can then be sequestered from the atmosphere, if desired, such as by pressurization and injection into a subterranean formation, such as an at least partially depleted oil well, natural gas field, or a sequestration site such as a deep saline aquifer or other subterranean formation.

The water separated from the working fluid within the condenser can be at least partially routed back to the gas generator with the water typically being repressurized by a feed water pump and preferably heated by at least one feed water heater before being routed to the gas generator upstream from the high pressure path of the reheat heat exchanger. Detailed analysis summarized herein illustrates that significant efficiency enhancement can be provided with the inclusion of the reheat heat exchanger within the power generation systems disclosed herein.

OBJECTS OF THE INVENTION

Accordingly, a primary object of the present invention is to provide power generation systems which do not generate nitrogen oxides by combusting a hydrocarbon fuel with oxygen rather than air.

Another object of the present invention is to provide power generation systems which are based on combustion of a hydrocarbon fuel and which discharge the carbon dioxide in a separate stream which can be beneficially used or sequestered without release into the atmosphere.

Another object of the present invention is to provide zero emissions power generation systems which can use existing commonly available steam turbine technology while still attaining high thermal efficiencies.

Another object of the present invention is to provide non-polluting combustion based power generation systems utilizing existing technology for relatively low cost new power plant installation and for retrofitting existing power plants.

Another object of the present invention is to provide a reheat heat exchanger which can transfer heat from a high pressure path to a low pressure path of the same working fluid on either side of an expander within a power generation system to enhance an efficiency of the power generation system.

Other further objects of the present invention will become apparent from a careful reading of the included drawing figures, the claims and detailed description of the invention.

BRIEF DESCRIPTION OF THE DRAWINGS

FIG. 7 is a table illustrating various different performance parameters for the power generation systems of FIGS. 2–6.

DESCRIPTION OF THE PREFERRED EMBODIMENT

Figure 1:
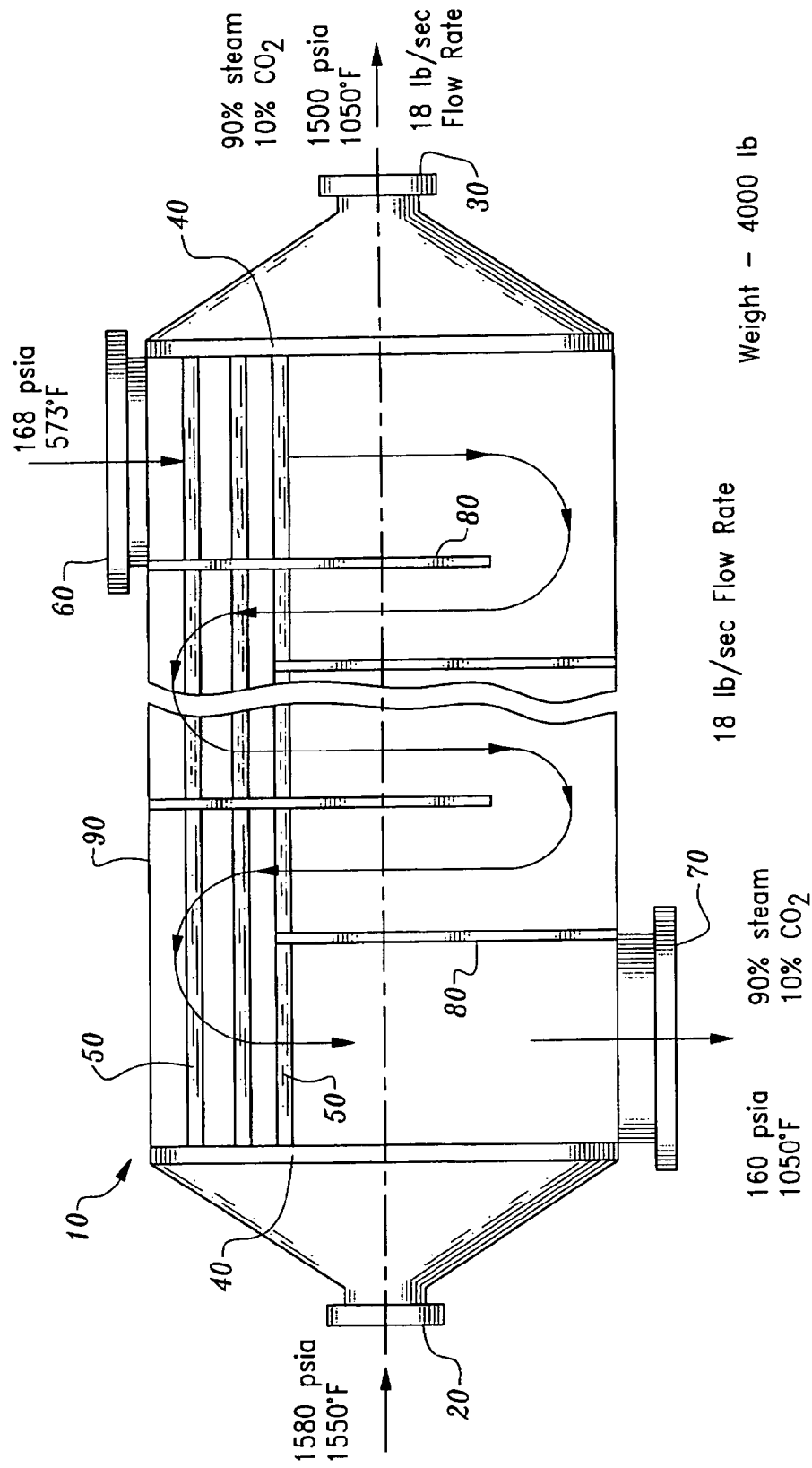
FIG. 1 is a full sectional view of the reheat heat exchanger of this invention.

Referring to the drawings, wherein like reference numerals represent like parts throughout the various drawing figures, reference numeral 10 (FIG. 1) is directed to a reheat heat exchanger for use within a combustion based power generation system, such as those depicted in FIGS. 2–6 for enhancement of thermal efficiency of such power generation systems. The reheat heat exchanger 10 is particularly suited for both decreasing a temperature of a working fluid before entering a high pressure turbine and for increasing a temperature of the working fluid after it has discharged from the high pressure turbine and before being passed on to a lower pressure turbine. In this way, a single gas generator producing the working fluid at a temperature higher than maximum inlet temperatures for the turbines can be effectively utilized to achieve the maximum temperature for the inlets of both the high temperature turbine and a lower pressure turbine, without requiring, for instance, a combustion reheater, and still achieving relatively high thermal efficiencies.

In essence, and with particular reference to FIG. 1, basic features of the reheat heat exchanger 10 are described. The reheat heat exchanger 10 is preferably in the general form of a tube and shell heat exchanger. A high pressure inlet 20 is spaced from a high pressure outlet 30 by a pair of tube sheets 40 and with a plurality of tubes 50 extending between the tube sheets 40. A low pressure inlet 60 is spaced from a low pressure outlet 70. A series of baffles 80 are provided between the low pressure inlet 60 and the low pressure outlet 70 so that an appropriate distance can be provided for the low pressure path between the low pressure inlet 60 and the low pressure outlet 70.

The low pressure path is adjacent exterior surfaces of the tubes 50 while a high pressure path is provided within an interior of the tubes 50. The low pressure path is additionally housed within a casing 90 within which the tubes 50 are located and with the baffles 80 defining the path for the low pressure working fluid between the low pressure inlet 60 and the low pressure outlet 70.

More particularly, and with further reference to FIG. 1, particular details of the reheat heat exchanger are described. The reheat heat exchanger 10 is preferably formed of materials which can handle the temperatures specified for the reheat heat exchanger and which can handle any corrosion accompanying a working fluid of approximately ninety percent steam and ten percent carbon dioxide by volume, and with perhaps up to one percent oxygen. One material capable of operation within such an environment is Inconel 617.

While the reheat heat exchanger 10 is preferably in the form of a tube and shell heat exchanger, it could alternatively have any desired form of heat exchanger configuration, provided that it can achieve the temperature change and transfer characteristics required between the low pressure path and the high pressure path within the reheat heat exchanger 10.

Particularly, the high pressure path is most preferably between 1580 psi at the high pressure inlet 20 and 1500 psi at the high pressure outlet 30. The high pressure path drops in temperature from 1550° F. at the high pressure inlet 20 to 1050° F. at the high pressure outlet 30. A flow rate of eighteen pounds per second is preferred for the high pressure path between the high pressure inlet 20 and the high pressure outlet 30.

This high pressure path preferably includes a pair of tube sheets 40 with 100 tubes extending therebetween and with each tube having a 1.00 inch outer diameter and a 0.44 inch inner diameter. The tubes 50 are preferably approximately fourteen feet long and the casing 90 is approximately twenty-six inches in diameter.

A sufficient number of baffles 80 are preferably provided in an alternating pattern so that a length of the low pressure path is sufficient to achieve the temperature rise required for the working fluid along the low pressure path. Particularly, at the low pressure inlet the working fluid is preferably 168 psi and 573° F. At the low pressure outlet, the working fluid is preferably 160 psi and 1050° F.

If the second turbine or other expander, also referred to as the intermediate pressure turbine, can handle a higher temperature than the high pressure turbine, the reheat heat exchanger could be configured so that the temperature at the low pressure outlet 70 could be higher than 1050° F., and conceptually up to as high as 1550° F. The low pressure path preferably has a flow rate of eighteen pounds per second.

The various temperature, pressure and flow rate parameters for the reheat heat exchanger 10 are selected for use within the power generation system shown in FIG. 3 (discussed in detail below). These temperatures, pressures and flow rates could be appropriately modified in either an upward or downward direction depending on the particular needs of any modified power generation system.

Figure 2:
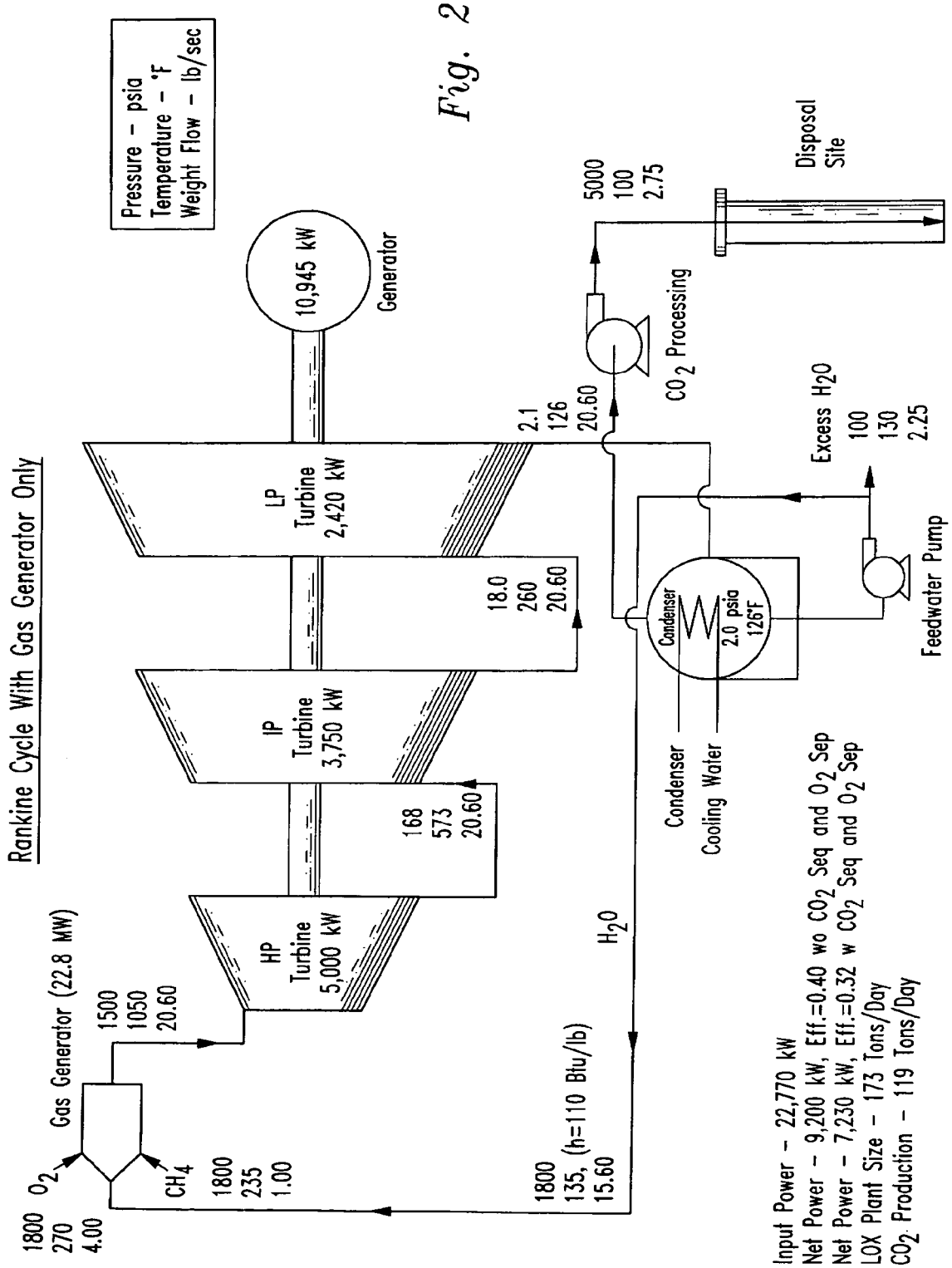
FIG. 2 is a schematic of a Rankine cycle power generation system featuring an oxygen and natural gas fired gas generator and without the reheat heat exchanger of this invention, as a baseline system for comparison purposes.

With particular reference to FIGS. 2–6, details of various different power generation systems within which the reheat heat exchanger of this invention could beneficially be utilized, are described in detail. In FIG. 2 a Rankine cycle power generation system is disclosed which utilizes a gas generator only, and with no reheat heat exchanger, no combustion based reheater, and no feed water heaters. This power generation system of FIG. 2 acts as a baseline for comparison to later described power generation systems of FIGS. 3–6.

Adjacent various locations within the power generation system the parameters of the working fluid are provided numerically. Specifically, the upper number represents the pressure of the working fluid in pounds per square inch, the middle number represents the temperature of the working fluid in degrees Fahrenheit, and the lower number represents the weight flow for the working fluid in pounds per second. Also, for each component the power generated or required is identified. Various parameters including efficiency and the amount of carbon dioxide produced and the size of liquid oxygen plant (or gaseous oxygen plant) required to oxidize fuel in the gas generator are provided for informational purposes. Arrows are provided to indicate the direction of working fluid flow.

With the schematic of FIG. 2 (and the other figures) the expanders are particularly identified as turbines. However, the expanders could similarly be piston and cylinder type expanders, axial flow turbines, centrifugal turbines, or any other form of expander either currently known or developed in the future.

The power generation systems of FIGS. 2–6 each show a high pressure (HP) turbine, an intermediate pressure turbine (IP) and a low pressure turbine (LP). However, the basic system of this invention could conceivably be operated with as little as only one turbine or other expander. Most typically, at least two turbines or other expanders would be provided to maximize the benefits associated with the reheat heat exchanger of this invention.

Each of the turbines, or other expanders, are shown in FIGS. 2–6 as being positioned upon a common shaft coupled to a generator. However, such an arrangement linking the turbines together mechanically is not strictly required. Rather, each of the turbines could drive their own generator, or could otherwise be utilized separately or coupled together in a manner other than along a common shaft to drive various different portions of the power generation system. For instance, one of the turbines could be sized to power the feed water pump or to provide power to the liquid oxygen plant or to provide power to compress the carbon dioxide if it is required that it be pressurized for injection into a subterranean formation.

Also, the power generation systems of FIGS. 2–6 are shown as closed Rankine cycle power generation systems with a portion of the water exiting the condenser being pressurized and recirculated to the gas generator. Such a closed cycle arrangement is not strictly required, but the cycles could instead be "open." Similarly, while FIGS. 2–6 each show CO2 processing and a disposal site, the carbon dioxide could be exhausted to the environment when deemed acceptable, or could be otherwise utilized as part of other manufacturing processes which utilize carbon dioxide.

Note that the power generation system of FIG. 2 has a thermal efficiency of forty percent when taking into account the power required for separation of oxygen from air but without taking into account the power required to sequester the carbon dioxide within a subterranean formation at a pressure of 5000 pounds per square inch. When the power required for both oxygen separation from the air and carbon dioxide pressurization for sequestration is taken into account, a thermal efficiency of thirty-two percent is achieved. These efficiency numbers act as a baseline for comparison with other power generation systems of FIGS. 3–6 discussed in detail below.

Figure 3:
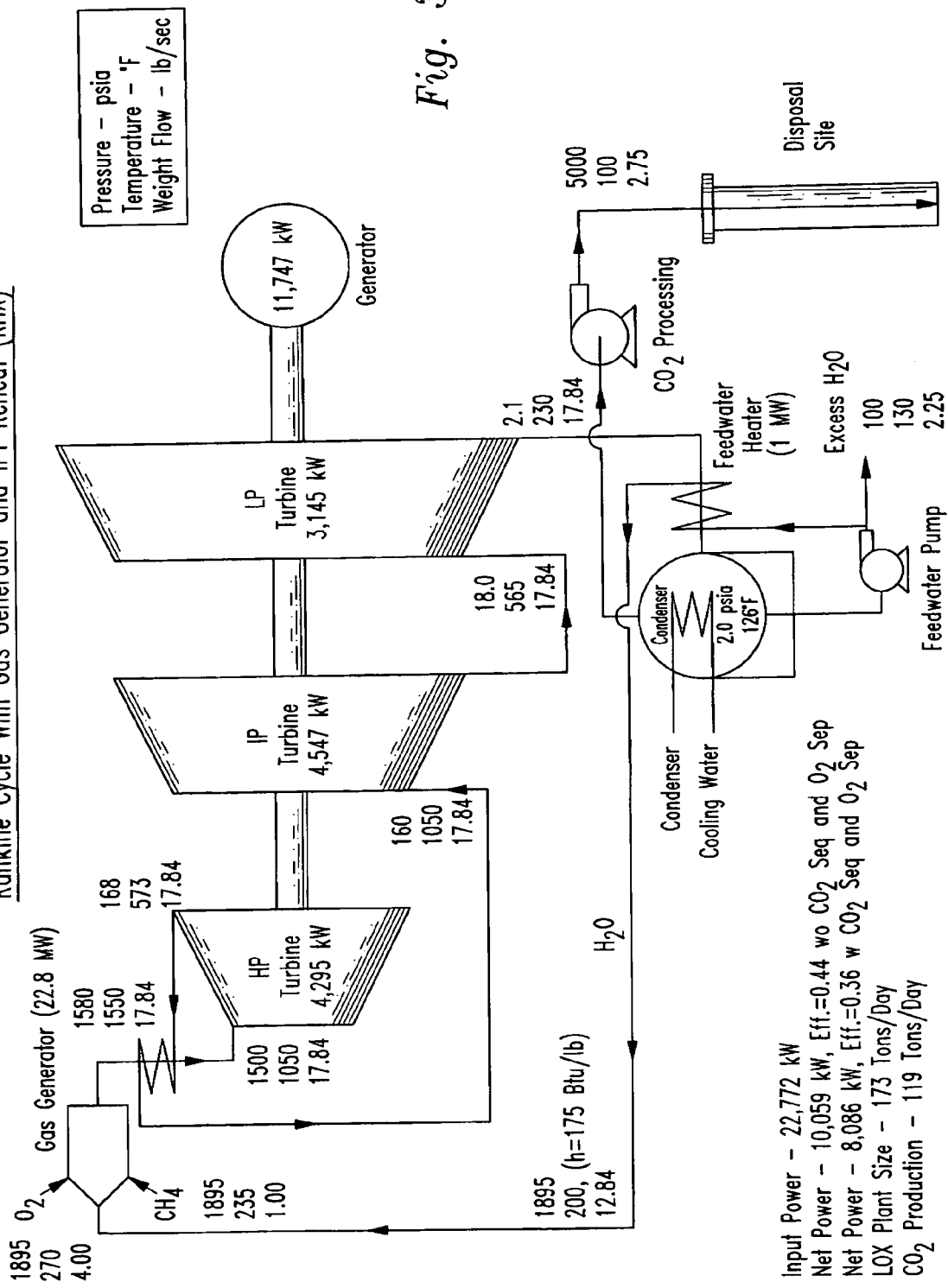
FIG. 3 is a schematic similar to that which is shown in FIG. 2 but with the inclusion of a reheat heat exchanger between the gas generator and the high pressure turbine and the inclusion of a feed water heater for the recirculated water.

With particular reference to FIG. 3, a Rankine cycle power generation system is described with an oxyfuel combustion gas generator and featuring a reheat heat exchanger between the gas generator and the high pressure turbine. This power generation system of FIG. 3 is similar to the power generation system of FIG. 2 except where particularly identified below. This power generation system of FIG. 3 includes a reheat heat exchanger between the gas generator and the high pressure turbine.

Particularly, the reheat heat exchanger has its high pressure inlet positioned to receive the high pressure high temperature working fluid including steam and carbon dioxide from the gas generator. The high pressure working fluid is decreased in temperature within the reheat heat exchanger until it is discharged at the high pressure outlet at a temperature preferably substantially matching the maximum inlet temperature for the high pressure turbine.

The working fluid is then expanded to a lower pressure and attains a corresponding lower temperature. Next, the working fluid is routed to the low pressure inlet of the reheat heat exchanger, where it is reheated before reaching the low pressure outlet at a temperature of 1050° F. This working fluid is then passed to the intermediate pressure turbine where further power is extracted from the working fluid.

This power generation system of FIG. 3 additionally includes a feed water heater along the recirculation line delivering water from the condenser back to the gas generator. This feed water heater acts to increase a temperature of the water from 126° F. to 200° F. so that the water has been heated and optionally turned at least partially to steam before being delivered to the gas generator before mixing with the products of combustion of the oxygen with the hydrocarbon fuel within the gas generator.

Note that utilization of the reheat heat exchanger as shown in the power generation system of FIG. 3 significantly increases an amount of power generated by the intermediate pressure turbine. Also, an amount of power generated by the low pressure turbine is also increased. An amount of power generated by the high pressure turbine is only slightly decreased. Hence, with the same input power, the net power output is increased so that efficiencies of forty-four percent without CO2 sequestration and thirty-six percent with CO2 sequestration are provided. Both of these efficiencies take into account the power required to separate the oxygen from the air and keep inlet temperatures of all turbines, or other expanders, at or below 1050° F.

Figure 4:
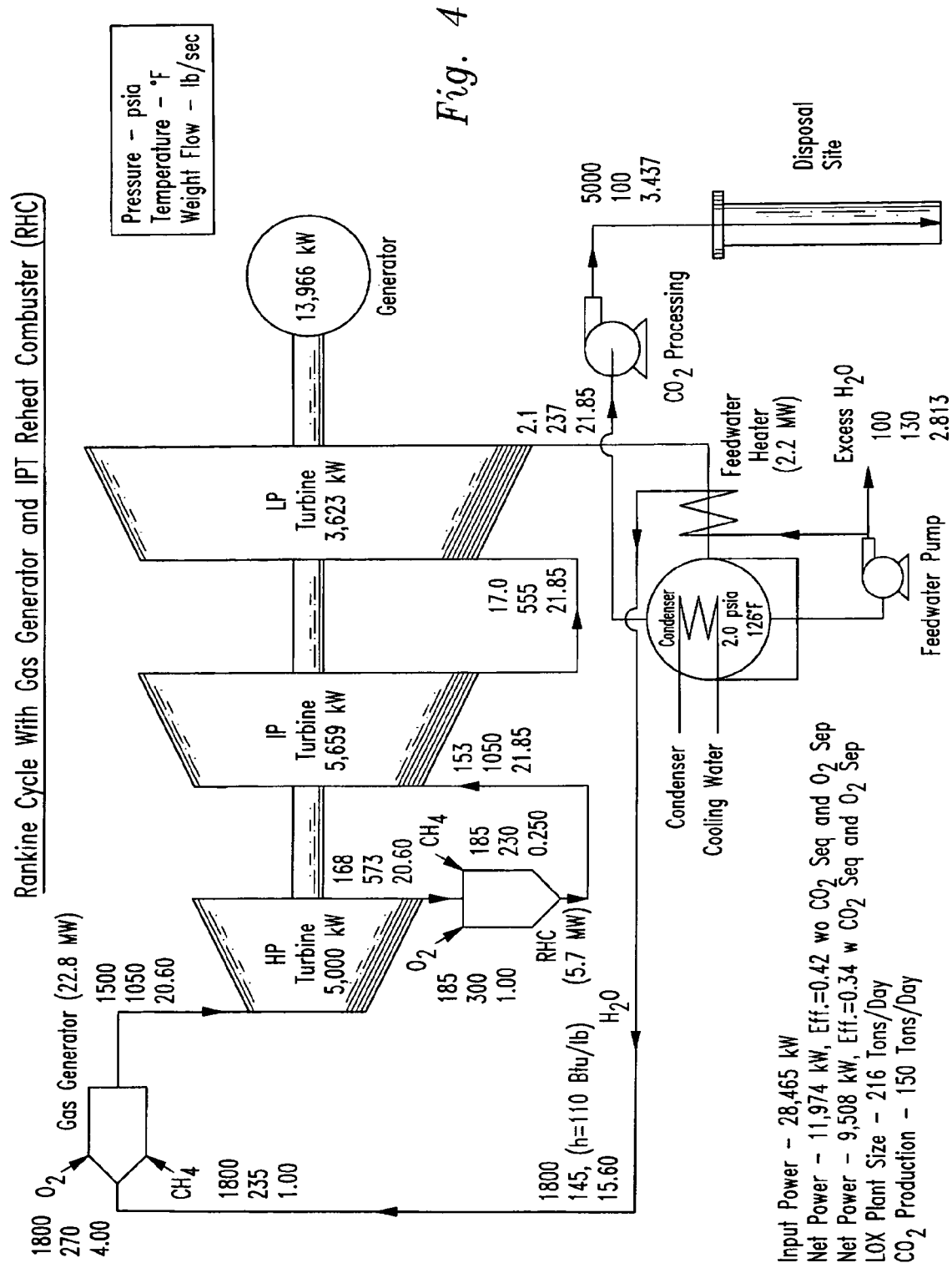
FIG. 4 is a schematic of a variation on the power generation system of FIG. 2 where a reheat combustor is utilized downstream from the high pressure turbine, rather than the reheat heat exchanger, and with the feed water heater, for comparison purposes.

With particular reference to FIG. 4, a further power generation system is provided for comparison. In this power generation system, the reheat heat exchanger has been removed, but the feed water heater has been kept. Also, a reheat combustor has been provided between the high pressure turbine and the intermediate pressure turbine. Thus, in many ways the reheat heat exchanger has merely been replaced with the reheat combustor. The reheat combustor receives oxygen and methane (or natural gas) along with the mixture of steam and carbon dioxide discharged from the high pressure turbine. The reheat combustor combusts the fuel with the oxygen to increase both a temperature and mass flow rate of the working fluid downstream from the reheat combustor before being delivered to the intermediate pressure turbine.

While this power generation system of FIG. 4 produces additional power compared to the power generation system of FIG. 3, it also requires additional fuel and oxygen within the reheat combustor, in contrast with the power generation of FIG. 3 teaching the reheat heat exchanger. The net result is efficiencies of this power generation system of FIG. 4 of between forty-two percent without CO2 sequestration and thirty-four percent with CO2 sequestration, provided that the power required for oxygen separation is taken into account. A comparison of the power generation systems of FIG. 3 and FIG. 4 illustrates that utilization of a reheat heat exchanger provides an efficiency benefit over utilization of a reheat combustor, at least in the power generation systems particularly depicted in FIGS. 3 and 4.

Figure 5:
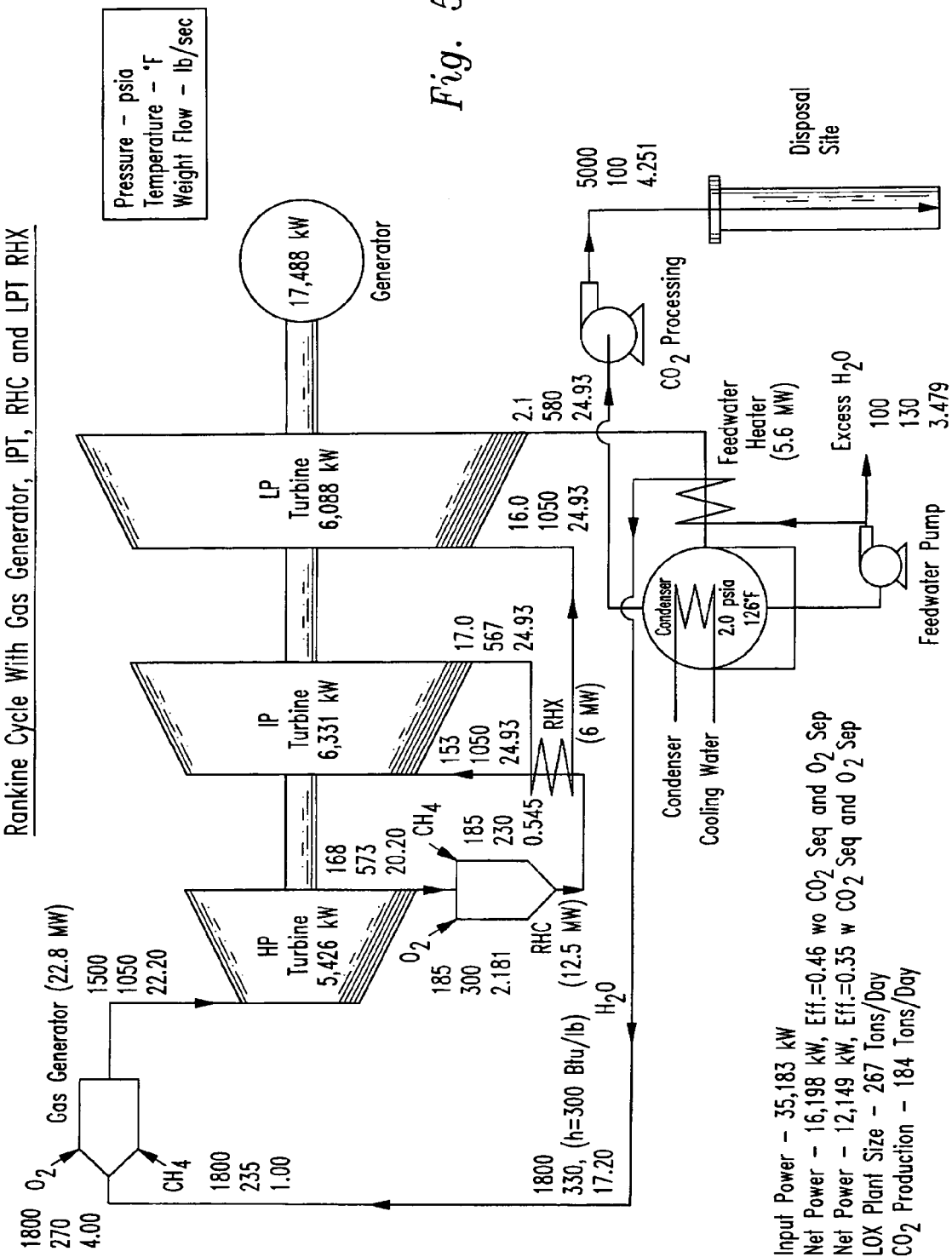
FIG. 5 is a schematic of a power generation system including both a reheat combustor downstream from the high pressure turbine and a reheat heat exchanger between the reheat combustor and the intermediate pressure turbine, and also including a feed water heater.

FIG. 5 depicts a further power generation system which utilizes both a reheat combustor and a reheat heat exchanger within the same cycle. This power generation system of FIG. 5 also still includes the feed water heater similar to that depicted in FIGS. 3 and 4. In the power generation system of FIG. 5 the reheat heat exchanger is interposed between the reheat combustor and the intermediate pressure turbine, rather than between the gas generator and the high pressure turbine. This arrangement is one of many conceivable arrangements for reheat combustors and reheat heat exchangers between the various components.

In this embodiment of FIG. 5 the reheat combustor would typically produce a high temperature high pressure working fluid of steam and carbon dioxide which would have a temperature of approximately 1550° F. and a pressure of approximately 168 pounds per square inch, similar to the parameters preferred for the reheat heat exchanger. This power generation system exhibits a higher efficiency than the power generation systems of FIGS. 2, 3 and 4 when no CO2 sequestration is required. However, if CO2 sequestration is required, efficiency of thirty-five percent is slightly less than that of the power generation system of FIG. 3, featuring a reheat heat exchanger and no reheat combustor.

Figure 6:
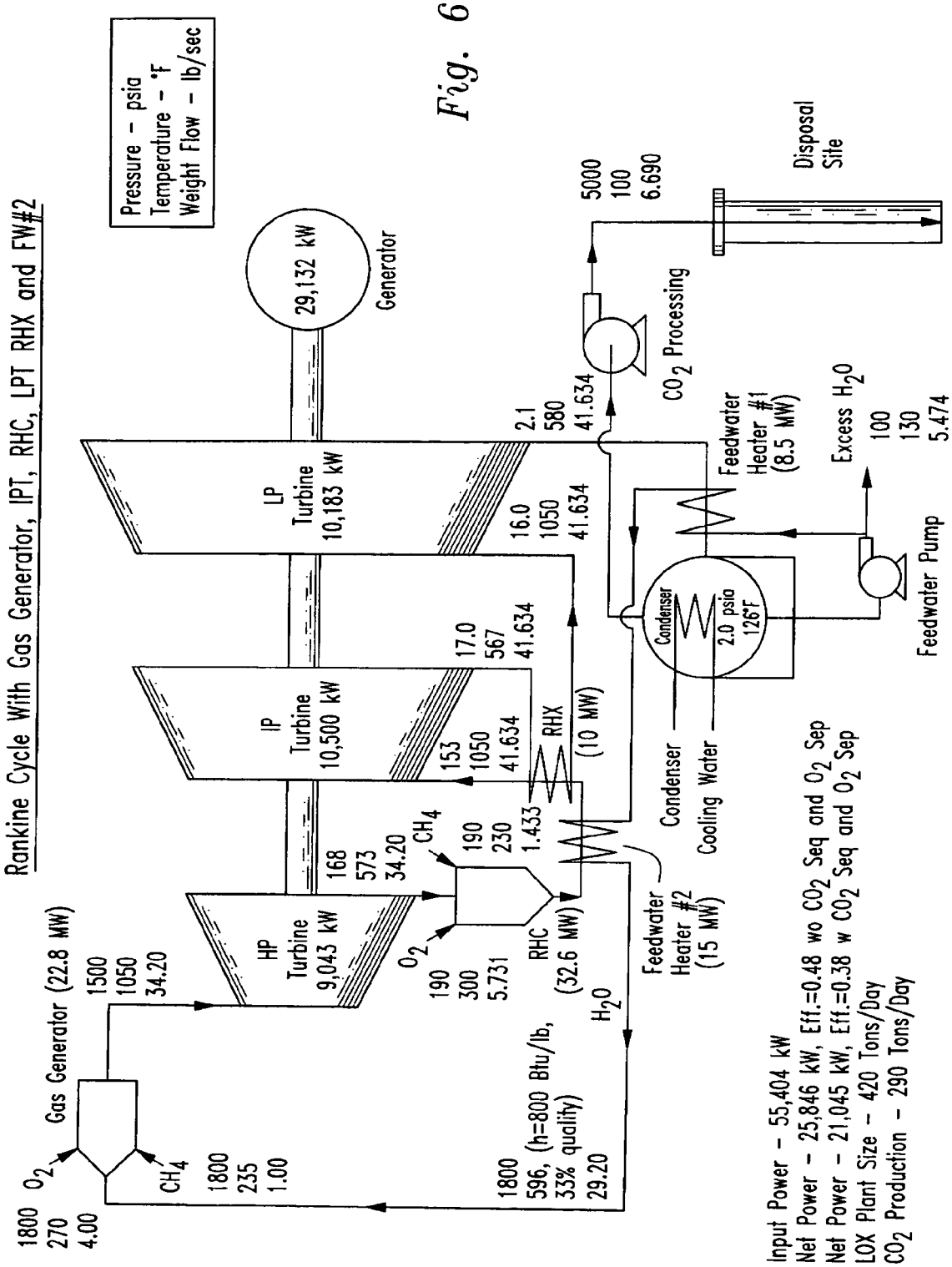
FIG. 6 is a schematic of a power generation system similar to that which is shown in FIG. 5 but additionally including a second feed water heater for maximum efficiency attainment without exceeding turbine inlet temperatures of 1050° F.

The power generation system of FIG. 6 is similar to the power generation system of FIG. 5 except that a second feed water heater is provided between the reheat combustor and the reheat heat exchanger for further heating of the water passed from the condenser back to the gas generator upstream of the high pressure turbine.

With regard to FIG. 6, it is understood that the second feed water heater and/or the reheater could conceivably be increased in size sufficiently to eliminate the need for the gas generator. Specifically, with such a variation the reheat combustor would generate sufficient heat for the overall power plant that a significant portion of this heat could be transferred through the feed water heater to the steam exiting the feed water pump from the condenser. This steam would be heated in the feed water heater to a temperature desired for operation of the high pressure turbine. Also, the feed water pump would provide sufficient pressure, along with pressure associated with conversion of the water from liquid to steam, such that the desired pressure (i.e. 1500 psi in the example of FIG. 6) at the inlet of the high pressure turbine would be achieved without requiring the gas generator. The high pressure turbine would thus expand pure steam, rather than a mixture of steam and carbon dioxide. The reheater downstream of the high pressure turbine would thus enter the fuel (natural gas in this example) and oxygen to generate a mixture of steam and carbon dioxide for further passage through the intermediate pressure turbine and low pressure turbine. While such a system would eliminate the gas generator, the reheater would itself become a gas generator similar to those described in the above listed patents incorporated herein by reference.

The power generation system of FIG. 6, while exhibiting some additional complexity in that it includes both the reheat combustor and the reheat heat exchanger, and two feed water heaters, exhibits the highest efficiency both without CO2 sequestration and with CO2 sequestration.

FIG. 7 provides a table which compares the various different performance parameters of the power generation systems depicted in FIGS. 2–6. These various performance parameters are each achieved without having any turbines with inlet temperatures greater than 1050° F. Optimally, turbines would be utilized which can receive higher temperature working fluids at their inlets. For instance, aero-derivative turbines and other air/gas turbines utilized in modern combined cycle gas turbine power generation systems have inlet temperatures at or exceeding 2600° F., particularly when cooled turbine blades are employed. With such additional temperatures at the inlets of any or all of the turbines of such power generation systems, further efficiency gains can be attained. Reheat heat exchangers could similarly be utilized in such systems, but would require suitable materials for heat exchangers operating at such high temperatures.

The power plant schematics illustrated herein are particularly adapted to use state of the art, relatively low temperature, steam turbines. Some elevated temperature steam turbines have been developed, are in development, or may be developed in the future, which would be integratable into systems such as those disclosed herein. Hence, the relatively low temperatures illustrated in FIGS. 2–6 and 8 need not necessarily be considered maximum temperatures for systems such as those disclosed herein.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified when elements are identified as upstream or downstream of other elements, such positioning can be directly adjacent or with other elements therebetween, unless otherwise explicitly specified.

What is claimed is:

1. A power generation system featuring enhanced efficiency through the inclusion of a reheat heat exchanger, comprising in combination:
    a high temperature high pressure source of working fluid;
    a reheat heat exchanger having a high pressure inlet downstream from said high temperature high pressure source of working fluid, a high pressure outlet, a low pressure inlet, a low pressure outlet, a high pressure path between said high pressure inlet and said high pressure outlet and a low pressure path between said low pressure inlet and said low pressure outlet, said high pressure path located in heat transfer relationship with said low pressure path;
    an expander having an inlet downstream from said high pressure outlet and a discharge, said expander adapted to expand the working fluid therein from a higher pressure to a lower pressure;
    said discharge of said expander upstream from said low pressure inlet of said reheat heat exchanger; and
    wherein said source of working fluid is a source of a mixture of substantially only steam and carbon dioxide.

2. The power generation system of claim 1 wherein a separator is located downstream from said second expander, said separator adapted to separate at least some of the water in the working fluid from at least some of the carbon dioxide in the working fluid.

3. The power generation system of claim 2 wherein said separator includes a condenser having a condensed steam/water outlet and a gaseous carbon dioxide outlet.

4. The power generation system of claim 3 wherein at least a portion of the water at said condenser water outlet is recirculated to said source of working fluid.

5. The power generation system of claim 4 wherein a feed water heater is provided in heat transfer relationship with the working fluid between said discharge of said expander and said separator, said feed water heater adapted to heat the water being recirculated from said steam/water outlet of said condenser to said source of working fluid.

6. The power generation system of claim 4 wherein said source of working fluid includes a combustor having an oxygen inlet, a hydrocarbon fuel inlet and a water inlet, said water inlet located downstream from said water outlet of said condenser, said combustor adapted to combust the oxygen with the hydrocarbon fuel to create the working fluid of substantially only steam and carbon dioxide.

7. A power generation system featuring enhanced efficiency through the inclusion of a reheat heat exchanger, comprising in combination:
    a high temperature high pressure source of working fluid;
    a reheat heat exchanger having a high pressure inlet downstream from said high temperature high pressure source of working fluid, a high pressure outlet, a low pressure inlet, a low pressure outlet, a high pressure path between said high pressure inlet and said high pressure outlet and a low pressure path between said low pressure inlet and said low pressure outlet, said high pressure path located in heat transfer relationship with said low pressure path;
    an expander having an inlet downstream from said high pressure outlet and a discharge, said expander adapted to expand the working fluid therein from a higher pressure to a lower pressure;
    said discharge of said expander upstream from said low pressure inlet of said reheat heat exchanger; and
    wherein said source of working fluid includes a combustor having an oxygen inlet, a hydrocarbon fuel inlet and a water inlet, said combustor adapted to combust the oxygen with the hydrocarbon fuel to produce the working fluid of substantially only steam and carbon dioxide, said combustor adapted to mix the water from said water inlet with the combustion products produced within said combustor.

8. A method for enhancing efficiency of a power generation system having a high temperature high pressure source of a working fluid, a first working fluid expander and a second working fluid expander downstream from the first working fluid expander, the method including the steps of:
    providing a reheat heat exchanger having a high pressure inlet, a high pressure outlet, a low pressure inlet, a low pressure outlet, a high pressure path between the high pressure inlet and the high pressure outlet, and a low pressure path between the low pressure inlet and the low pressure outlet, the high pressure path located in heat transfer relationship with the low pressure path;
    locating the reheat heat exchanger with the high pressure inlet downstream from the source of high temperature high pressure working fluid, the high pressure outlet upstream from the first working fluid expander, said low pressure inlet located downstream from a discharge of the first working fluid expander, and the low pressure outlet located upstream from the second working fluid expander; and separating the working fluid into separate constituents including at least water and carbon dioxide downstream from the second expander.

9. The method of claim 8 including the further step of recirculating at least a portion of the water separated by said separating step back to the source of high temperature high pressure working fluid.

10. The method of claim 9 including the further step of heating at least a portion of the water during said recirculating step by passing the recirculated water in heat transfer relationship with the working fluid between the discharge of the first expander and a point of separation of the working fluid downstream from the second working fluid expander.

11. The method of claim 8 including the further step of sequestering at least a portion of the carbon dioxide separated by said separating step by pressurizing the carbon dioxide to at least a pressure within a terrestrial formation selected for sequestration of the carbon dioxide and delivering the pressurized carbon dioxide into the terrestrial formation.

12. A reheat heat exchanger comprising in combination:
a casing;
a pair of tube sheets interfacing with said casing;
a plurality of tubes extending between said tube sheets;
a high pressure inlet located adjacent at least one of said tube sheets;
a high pressure outlet located adjacent at least one of said tube sheets and opposite said high pressure inlet;
a high pressure path extending between said high pressure inlet and said high pressure outlet, said high pressure path defined at least partially by interiors of said tubes;
a low pressure inlet passing through said casing;
a low pressure outlet passing through said casing;
a low pressure path extending between said low pressure inlet and said low pressure outlet and in contact with an exterior surface of said tubes;
wherein a first expander is located downstream from said high pressure outlet, said first expander including a discharge located upstream from said low pressure inlet;
wherein a second expander is provided downstream from said low pressure outlet; and
wherein a recirculation pathway is provided between a location downstream from said second expander and a location upstream from said high pressure inlet.

13. The reheat heat exchanger of claim 12 wherein surfaces of said reheat heat exchanger are adapted to handle a working fluid including substantially only steam and carbon dioxide at temperatures greater than 1000° F.

14. The reheat heat exchanger of claim 12 wherein surfaces of said reheat heat exchanger are adapted to handle a working fluid including substantially only steam and carbon dioxide at temperatures of at least about 1500° F.

15. The reheat heat exchanger of claim 12 wherein a plurality of baffles are located within said casing and between said low pressure inlet and said low pressure outlet, said baffles configured to lengthen said low pressure path between said low pressure inlet and said low pressure outlet.

* * * * *